US012162012B2

(12) United States Patent
Peters et al.

(10) Patent No.: US 12,162,012 B2
(45) Date of Patent: Dec. 10, 2024

(54) SOLID PHASE MICROEXTRACTION DEVICE AND METHOD FOR FORMING

(71) Applicant: RESTEK CORPORATION, Bellefonte, PA (US)

(72) Inventors: Tracey A. Peters, Bellefonte, PA (US); German A. Gomez-Rios, San Jose, CA (US); Thomas E. Kane, Bellefonte, PA (US)

(73) Assignee: Restek Corporation, Bellefonte, PA (US)

( * ) Notice: Subject to any disclaimer, the term of this patent is extended or adjusted under 35 U.S.C. 154(b) by 0 days.

(21) Appl. No.: 18/595,902

(22) Filed: Mar. 5, 2024

(65) Prior Publication Data

US 2024/0207849 A1 Jun. 27, 2024

Related U.S. Application Data

(62) Division of application No. 17/103,375, filed on Nov. 24, 2020, now Pat. No. 11,951,480.

(Continued)

(51) Int. Cl.
*B01L 3/00* (2006.01)

(52) U.S. Cl.
CPC . *B01L 3/502753* (2013.01); *B01L 2200/0621* (2013.01); *B01L 2200/0631* (2013.01);
(Continued)

(58) Field of Classification Search
CPC ....... B01L 3/502753; B01L 2200/0621; B01L 2200/0631; B01L 2200/0652;
(Continued)

(56) References Cited

U.S. PATENT DOCUMENTS

| 9,733,234 B2 | 8/2017 | Pawliszyn et al. |
| 10,545,077 B2 | 1/2020 | Pawliszyn et al. |

(Continued)

FOREIGN PATENT DOCUMENTS

| EP | 1482840 B1 | 12/2008 |
| EP | 3841607 A1 | 6/2021 |

(Continued)

OTHER PUBLICATIONS

Clark, Kevin D., et al.; Magnetic ionic liquids in analytical chemistry: A review; Analytica Chimica Acta; Department of Chemistry, Iowa State University, Ames, IA 50011, USA; (2016) 9-21.

(Continued)

*Primary Examiner* — Jill A Warden
*Assistant Examiner* — Jacqueline Brazin
(74) *Attorney, Agent, or Firm* — McNees Wallace & Nurick

(57) ABSTRACT

A solid phase microextraction device is disclosed, including a substrate having a planar surface and a sorbent layer disposed on the planar surface. The planar surface is defined by a base edge, a spray edge disposed distal across the substrate from the base edge, the spray edge including a tapering tip extending away from the base edge, a first lateral edge extending from the base edge to the tapering tip, and a second lateral edge extending from the base edge to the tapering tip, the second lateral edge being disposed distal across the substrate from the first lateral edge. The sorbent layer extends a sampling length from the spray edge toward the base edge and includes sorbent particles. A method for forming the solid phase microextraction device is disclosed, including applying the sorbent layer on the planar surface utilizing at least one of screen printing, stencil printing, or additive manufacturing.

16 Claims, 12 Drawing Sheets

Related U.S. Application Data

(60) Provisional application No. 62/941,325, filed on Nov. 27, 2019.

(52) U.S. Cl.
CPC ... *B01L 2200/0652* (2013.01); *B01L 2200/12* (2013.01); *B01L 2300/0864* (2013.01); *B01L 2400/0487* (2013.01)

(58) Field of Classification Search
CPC ......... B01L 2200/12; B01L 2300/0864; B01L 2400/0487; G01N 2030/009; G01N 1/405; H01J 49/00
USPC ........................................................ 422/502
See application file for complete search history.

(56) References Cited

U.S. PATENT DOCUMENTS

| | | |
|---|---|---|
| 2014/0322518 A1 | 10/2014 | Addleman et al. |
| 2015/0318160 A1* | 11/2015 | Pawliszyn ........... H01J 49/0409 250/288 |
| 2016/0195456 A1 | 7/2016 | Martin et al. |
| 2017/0254732 A1* | 9/2017 | Pawliszyn .......... B01J 20/28007 |

FOREIGN PATENT DOCUMENTS

| | | |
|---|---|---|
| JP | 2018521310 | 8/2018 |
| JP | 2019508686 | 3/2019 |
| WO | 2019036414 A1 | 2/2019 |

OTHER PUBLICATIONS

Singh, Varoon, et al; Polyvinylidene difluoride: A Universal Binder for Preparation of Solid Phase Microextraction Devices; Department of Chemistry, University of Waterloo, 200 University Avenue West, Waterloo, Ontario N2L 3G1, Canada.

Office Action issued to European counterpart Application No. 20828430.7 dated Jun. 14, 2024.

\* cited by examiner

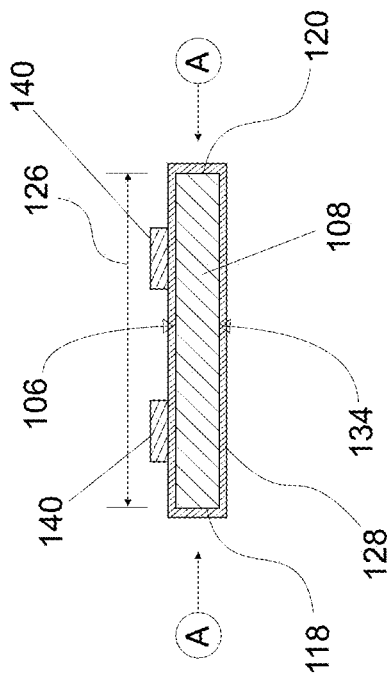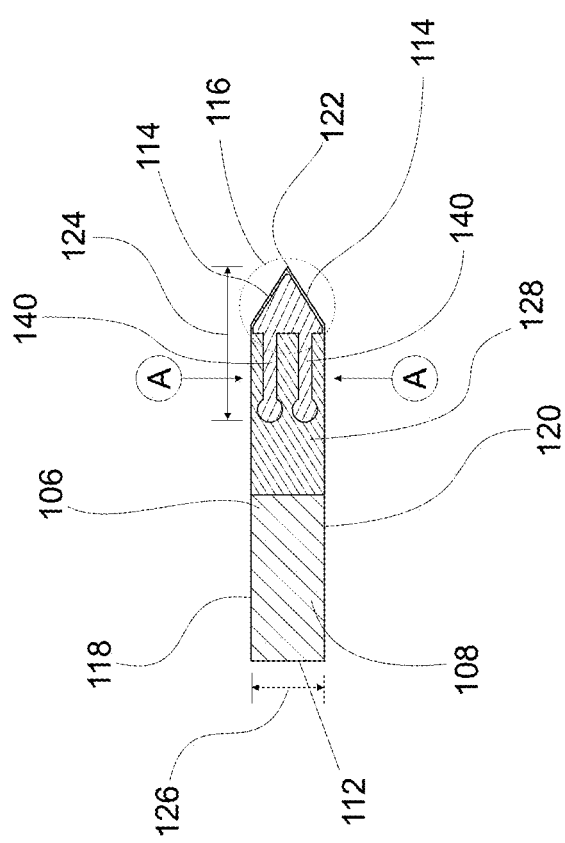
FIG. 1F

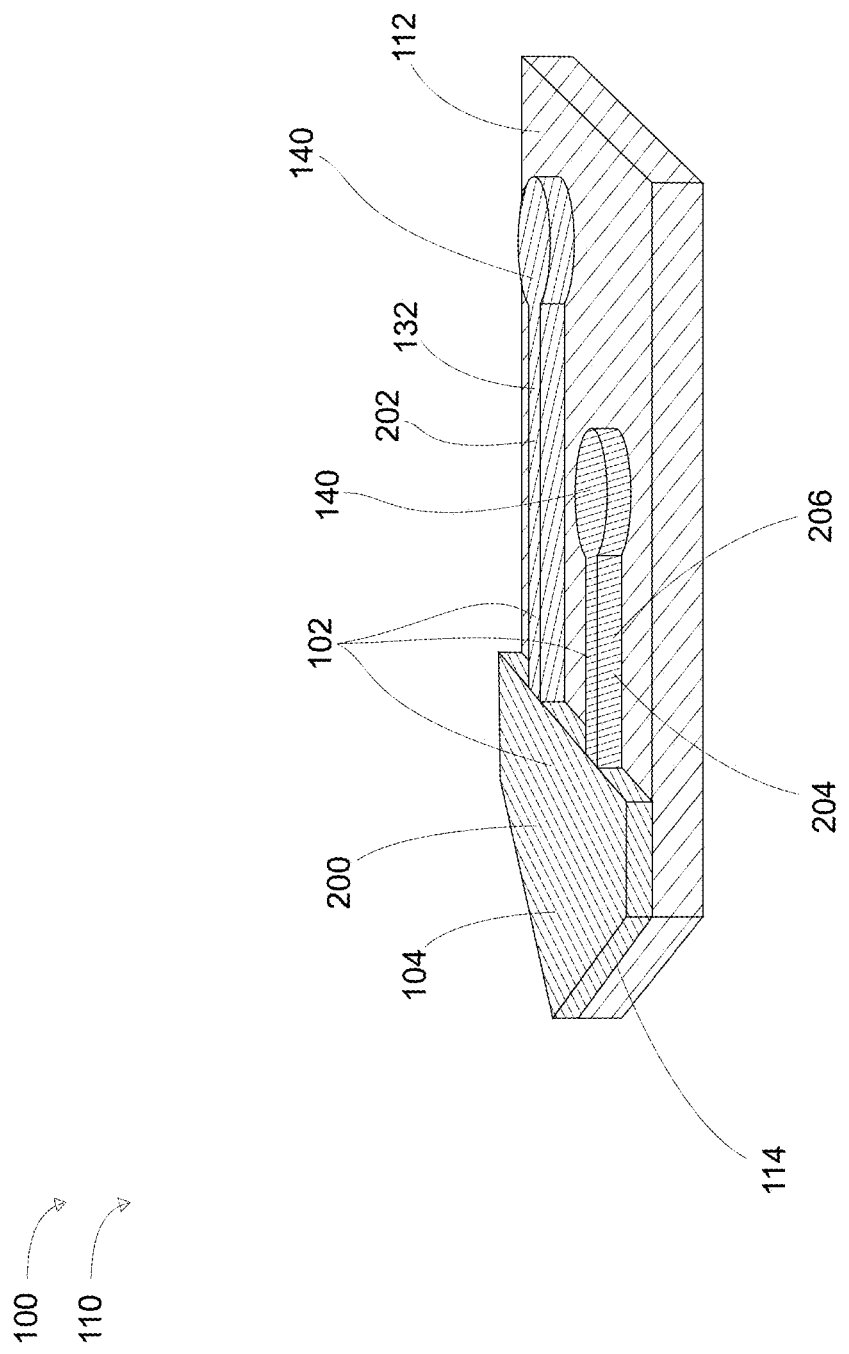

SOLID PHASE MICROEXTRACTION DEVICE AND METHOD FOR FORMING

RELATED APPLICATIONS

This application is a divisional application of and claims the benefit of and priority to U.S. patent application Ser. No. 17/103,375, filed Nov. 24, 2020 and entitled "Solid Phase Microextraction Device and Method for Forming" which claims the benefit of and priority to U.S. Prov. App. No. 62/941,325, filed Nov. 27, 2019, entitled "Methods for Fabrication of Smart Coated Substrates," which are hereby incorporated by reference in their entirety.

FIELD OF THE INVENTION

This application is directed to solid phase microextraction devices and methods for forming solid phase microextraction devices. In particular, this application is directed to solid phase microextraction devices including a sorbent layer disposed over less than an entire width of the devices and methods for forming solid phase microextraction devices with stenciling.

BACKGROUND OF THE INVENTION

Coated Blade Spray ("CBS") is a solid phase microextraction ("SPME")-based analytical technology previously described in the literature (Pawliszyn et al.; U.S. Pat. No. 9,733,234) that facilitates collection of analytes of interest from a sample and the subsequent direct interface to mass spectrometry systems via a substrate spray event (i.e., electrospray ionization).

"Coated blade spray," "CBS blade'", and "blade device" are used synonymously herein.

Blade devices are typically thin flat sheets with a pointed tip (tip angle of about 8-50°) and it is commonly manufactured of a conductive substrate such as stainless steel. As an SPME device, the substrate is partially coated with an extraction phase comprising of polymeric particles (e.g., silica modified with $C_{18}$ groups) and a binder (e.g., polyacrylonitrile ("PAN")). The function of the polymeric particles is to enrich the analytes of interest from the sample matrix while collecting the least amount of interferences. The binder concomitantly accomplishes multiple functions including, but not limited to, strongly attaching polymeric particles to the solid substrate, protecting the solid substrate from potential adherence of matrix components, and preventing the enrichment of ionic species onto the polymeric particles. Likewise, while the binder provides a strong mechanical adhesion of the particles to the surface of the substrate, it does not reduce or mask the analyte collection properties of the extractive particles. In cases where a layer of binder is applied onto the solid substrate without a polymeric extraction material/particle, it is known as a primer layer. The process of applying such a primer layer is referred to as "priming." Thin coatings have been preferred for direct-to-mass spectrometry ("MS") applications as these facilitate rapid catch and release of the target analytes. As a direct to MS device, the CBS device requires a pre-wetting of the extraction material so to elute the analytes collected on it. Subsequently, a differential potential is applied between the non-coated area of the substrate and the inlet of the MS system generating an electrospray at the tip of the CBS device.

Known methods for manufacturing CBS devices includes dip-coating and spray coating. Additional known methods for manufacturing CBS devices include sputtering, spin-coating, doctor blading, sol-gel chemistry, and electrospinning. In the case of flat substrates, dipping has been the method of preference as it may form homogenous thin coatings while minimizing the waste of coating slurry as only the coating-binder deposited on the surface of the substrate is removed from the slurry bulk. Automation of dipping coating is readily available, and one or multiple devices may be coated at a time using this methodology. Although the dip-coating process possesses multiple advantages, such as easiness of automation, the process may lead to coating of the tip of the substrate and subsequently hampering the capabilities of the device to generate an electrospray. Additionally, dip-coating methods are not amenable to selectively applying coatings to a particular region of the substrate, as the entire substrate is immersed in the coating slurry.

A manufacturing problem that arises when preparing thin layers of open particle beds is the potential chemical incompatibility between the particles and the solvents employed in the coating slurry. When the slurry is still, if the particles are not compatible with the slurry solvent, it results in rapid precipitation or separation due to differences in density, polarity, and size. Such problems are commonly observed in processes employing low viscosity slurries such as dip coating.

Dipping techniques for deposition of the sorbent bed onto CBS device substrates require sufficiently low viscosity slurries to permit the deposition of uniform, thin layers (≤30 μm) of particles. Dilute, fluid slurries designated for dipping procedures require continuous stirring to maintain particle distribution. Low viscosity slurry formulations affect the distribution of particles both under agitation (mixing) and while still (no agitation). Great care is required to tailor the slurry composition to allow (1) uniform particle distribution in solution (effective bonding of the resulting cured bed with the underlying substrate, and (2) a means to dip coat thin, uniform layers of particles. This complex matrix of specifications may limit the choice of particles and solvent viscosity combinations.

In some cases (e.g. two particle types having extremely opposite chemical polarities), the ability to create a homogeneous, low viscosity mixture is extremely limited. Slurry volumes are preferably still (i.e., the mixing agitation is shut off) during the dipping process. Mixtures of particles having very difference densities, sizes, polarities, or other physical or chemical properties may rapidly separate or settle when the slurry is in the still state. The lower the viscosity, the greater the speed of separation. Generally, the higher the viscosity, the thicker the coating when the blade substrate is dipped.

Other methods, such spray coating and sputtering, may be used to achieve spatial resolution and distribution of the extractive coating (<100 μm); however, these methods are difficult to automate, onerous, and in some cases, wasteful. Hence, there is need of a coating process that guarantees not only reproducible device-to-device coverings but also precise coating limits allowing for reproducible non-coated tips on the smart substrate.

BRIEF DESCRIPTION OF THE INVENTION

In one exemplary embodiment, a sold phase microextraction device includes a substrate having a first planar surface and a first sorbent layer disposed on the first planar surface. The first planar surface is defined by a base edge, a spray edge disposed distal across the substrate from the base edge, the spray edge including a tapering tip extending away from the base edge, a first lateral edge extending from the base edge to the tapering tip, and a second lateral edge extending from the base edge to the tapering tip, the second lateral edge being disposed distal across the substrate from the first lateral edge. The first sorbent layer extends a sampling length from the spray edge toward the base edge and includes first sorbent particles. The first sorbent layer is disposed over less than an entire width of the first planar surface from the first lateral edge to the second lateral edge along the sampling length.

In another exemplary embodiment, a method for forming a solid phase microextraction device includes applying a first sorbent layer including first sorbent particles on a first planar surface of a substrate. The first planar surface is defined by a base edge, a spray edge disposed distal across the substrate from the base edge, the spray edge including a tapering tip extending away from the base edge, a first lateral edge extending from the base edge to the tapering tip, and a second lateral edge extending from the base edge to the tapering tip, the second lateral edge being disposed distal across the substrate from the first lateral edge. The first sorbent layer extends a sampling length from the spray edge toward the base edge. The applying of the first sorbent layer on the first planar surface includes at least one of screen printing, stencil printing, or applying by additive manufacturing the first sorbent particles on the first planar surface

BRIEF DESCRIPTION OF THE DRAWINGS

FIG. 1F illustrates a CBS device having a primer layer applied to a solid substrate and a sorbent particle bed applied to the primer layer over a portion of a surface of a solid substrate less than the entire width of the first surface, according to an embodiment of the present disclosure.

FIG. 2 illustrates a CBS device having a first sorbent particle bed applied to a first portion of a surface of a solid substrate, a second sorbent particle bed applied to a second portion of the surface of the solid substrate less than the entire width of the surface, and a third sorbent particle bed applied to a third portion of the surface of the solid substrate less than the entire width of the surface, according to an embodiment of the present disclosure.

Wherever possible, the same reference numbers will be used throughout the drawings to represent the same parts.

DETAILED DESCRIPTION OF THE INVENTION

Figure 1A:
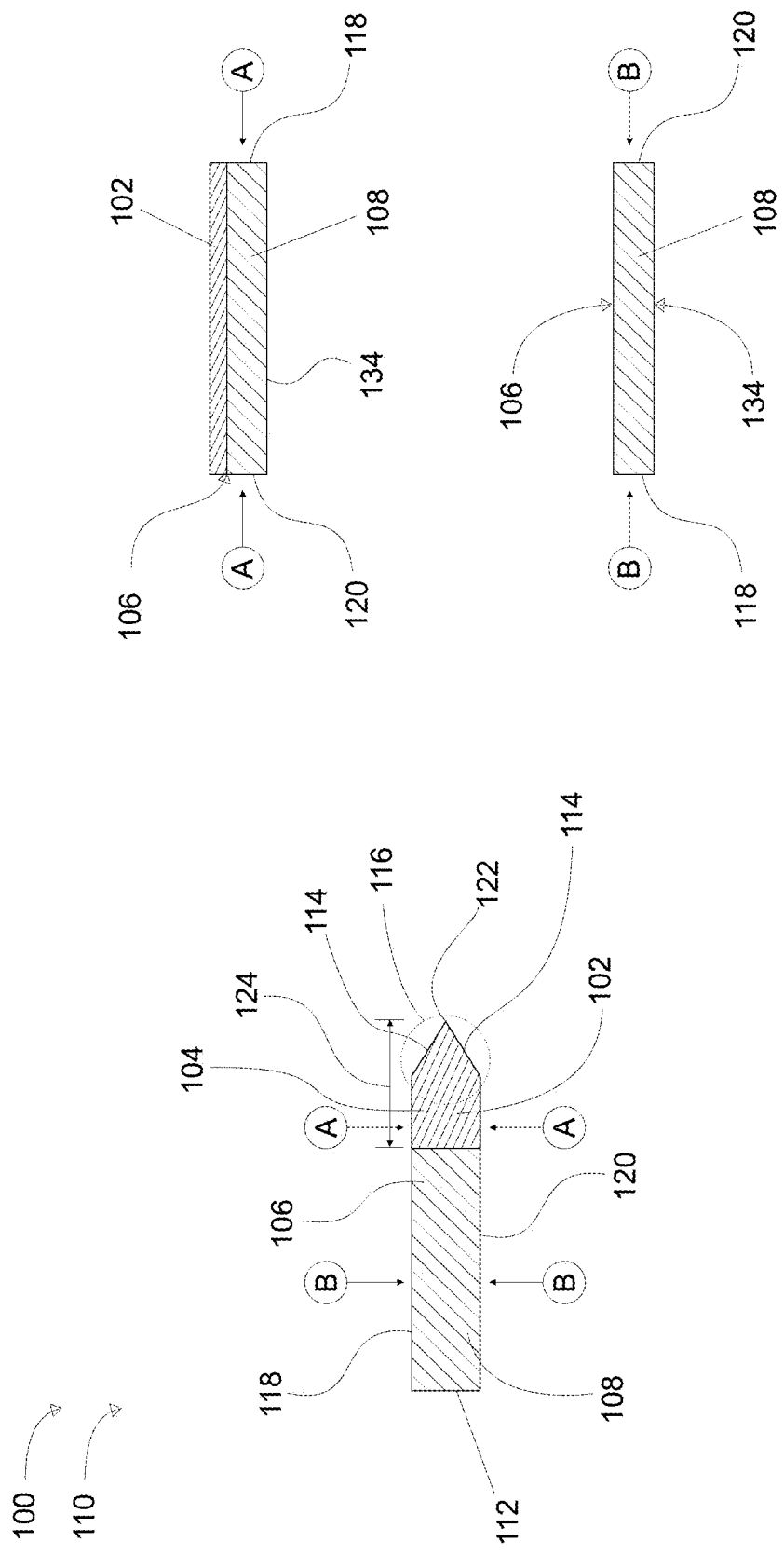
FIG. 1A illustrates a CBS device having a sorbent particle bed applied to a portion of surface of a solid substrate, according to an embodiment of the present disclosure.

Disclosed herein are solid phase microextraction devices including a sorbent layer disposed over less than an entire width of the devices and methods for forming solid phase microextraction devices with stenciling techniques. The devices and methods disclosed herein, in comparison to devices and methods not including one or more of the features disclosed herein, increase spatial resolution of the extractive coating, facilitate intricate coating geometries and sophisticated combinations of coating chemistries on the substrates, decrease waste, increase production capacity, or combinations thereof.

As used herein, "about" indicates a variance of ±50% of the value being modified by "about," unless otherwise indicated to the contrary.

As used herein, "solid phase microextraction" includes, but is not limited to, a solid substrate coated with a polymeric sorbent coating, wherein the coating may include metallic particles, silica-based particles, metal-polymeric particles, polymeric particles, or combinations thereof, which are physically or chemically attached to the substrate. In some non-limiting examples, the solid substrate has at least one depression disposed in or protrusion disposed on a surface of the substrate and said substrate includes at least one polymeric sorbent coating disposed in or on the at least one depression or protrusion. The term "solid phase microextraction" further includes a solid substrate with at least one indentation or protrusion that contains at least one magnetic component for the collection of magnetic particles or magnetic molecules onto the solid substrate.

In contrast to dip-coating, spray coating, sputtering, spin-coating, doctor blading, sol-gel chemistry, and electrospinning, stenciling techniques, such as, but not limited to, screen printing and stencil printing, may be adapted to as to provide thin coating and high spatial resolution distribution of an extractive coating (<100 μm). Additive manufacturing techniques, such as, but not limited to, binder jet three-dimensional printing, stereolithography, fused capillary additive manufacturing, or combinations thereof, may also be used in lieu of stenciling techniques.

In the case of screen printing, a screen of a woven material (e.g., a stainless steel mesh) is attached to a frame under tension, and the pattern to be printed on the substrate is produced by selectively filling portions of the screen with an emulsion that is impermeable to the coating solution. Screen printing requires a viscous coating solution and low volatility, which in turn yields thicker coatings in comparison to dip coating or spin coating. The wet thickness of the coating is governed by the volume between the threads of the mask and thickness of the screen. Other factors such as the snap-off distance, the force with which the squeegee is pushed into the screen, and the viscosity of the solution are also relevant. Screen printing processes utilize a fixture where the substrates are mounted. Typically, the fixture comprises multiple ducts that, after activating vacuum suction, affix the parts to the fixture. Such fixtures inhibit movement of the parts during the screen printing process, assuring reproducible printing among parts. Unlike dip-coating, screen printing is suitable for creating well defined geometries with a high degree of resolution. The spatial resolution obtainable with screen printing is lower that inkjet printing; however, screen printing is significantly faster than inkjet printing, is scalable for mass-production, and provides sufficient spatial resolution for the uses described herein. In addition, screen printing may be applied to only a single side of a substrate at a time, facilitating the development of tridimensional complexity on the flat areas of the substrate.

In contrast to screen printing, stencil printing is typically made by either photoetching, laser cutting, or combinations thereof, on a sheet of metal or plastic. In addition, a cement-like slurry with ultra-low volatility (essentially a paste having a viscosity of at least 1,000 cP, alternatively at least 2,000 cP) is required to coat the surface. Furthermore, there is no need for a frame under tension as the squeegee delivers the coating on each of the open apertures and the thickness of the coating is determined by the thickness of the stencil. Similar to screen printing, a fixture where the substrates are mounted is utilized to assure the parts do not move during the printing process; hence, securing reproducible printing among devices. Unlike dip-coating, stencil printing is suitable for creating well defined geometries with a high degree of resolution. The spatial resolution obtainable with stencil printing is lower that inkjet printing; however, stencil printing is significantly faster than inkjet printing, is scalable for mass-production, and provides sufficient spatial resolution for the uses described herein. In addition, stencil printing may be applied to only a single side of a substrate at a time, facilitating the development of tridimensional complexity on the flat areas of the substrate.

Appropriately coated areas of the solid substrate may be used to collect molecules of interest from a sample and then said coated solid substrates may be interfaced with analytical instrumentation for measurement of said molecules. Slurries comprised of particles, binders, additives, and solvents may be disposed on a solid substrate via stenciling techniques or additive manufacturing to form the requisite coatings for collection of molecules. After applying the slurry to the solid substrate, the substrate slurry may be dried at a constant temperature to evaporate the solvent and adhere the binder to the surface of the solid substrate, thereby adhering the particles to the solid substrate.

By the methods disclosed herein, particle beds may be deposited on flat substrates. In particular, the particle bed shape may be different than the underlying substrate and, with respect to the flat plane surface area, the coating area is smaller. The particle bed shape may include regions of pads or channels, or other shapes, which are designed to direct the flow of the elution/ionization solvent along a localized portion of the CBS device, ultimately terminating at the tapered tip in one of the flat faces of the substrate. The regions of the CBS device where there is no particle bed may be simply exposed substrate, or substrate that has been primed, or substrate covered with a second different coating confined to the "negative space" of the blade with respect to the sorbent particle bed.

In order for complex sorbent particle bed shapes to effectively direct the flow of the elution solvent from one region of the CBS device to another, it is desirable for the elution solvent to be confined to the sorbent particle bed region and not wick onto the adjacent exposed substrate. One novel technique to confine the elution solvent to the sorbent particle bed region is to employ a substrate with a different chemical polarity than the elution solvent and the sorbent bed. This in turn inhibits or prevents the elution solvent from contacting the substrate region while freely moving along the sorbent particle bed region.

Particle to solvent ratios affect the slurry viscosity. Application techniques employing inherently higher viscosity slurries are less dependent on composition ratios. For instance, stenciling techniques employ high viscosity slurries. Higher viscosity decreases the movement of individual particles when the slurry is in a still state. As such, the higher viscosities used for stenciling techniques facilitate homogeneously suspending particles having different surface properties, densities, sizes, and chemical polarities for extended periods of time, and therefore promote an evenly homogenously distributed particle mixture in the sorbent bed.

Stenciling techniques also facilitate the formation of complex shaped sorbent particle beds on CBS device substrates, providing a pathway for additional flow-based functionality in CBS devices. More complex bed shapes such as channels, additional reservoir regions, and narrower channels towards the tip regions provide functionality to improve analysis signal, provide additional stages of sample preparation using the CBS device as the reaction vessel, or combinations thereof.

In cases where the solvent molecules include both polar and nonpolar moieties, additive particles may adjust the bulk polarity of the slurry. Relevant physical properties include the slurry viscosity, the vapor pressure of the slurry, and the bulk polarity of the slurry. The resulting cured bed physical properties may include the bulk polarity, the chemical reactivity, the bonding effectivity of the bed to the substrate, the long-term bed stability, and the sorbent compatibility with a wider range of elution solvents.

In cases where a primer layer polarity is essentially the same as the solvent employed when depositing the sorbent particle bed layer, the polarity properties of the sorbent particle bed and the underlying primer are very similar.

In CBS device designs employing more complex-shaped sorbent particle beds, the sorbent particle bed region is typically a portion of the underlying CBS device surface area. As such, there may be exposed substrate available to the elution solvent when the solvent is applied to the sorbent particle bed region. Unless there is a sufficient mechanical or chemical barrier to the elution solvent, the solvent may migrate off the sorbent particle bed region and onto the substrate itself. This migration behavior is often undesirable, particularly if the sorbent particle bed design is configured to direct the solvent flow from one confined region of the sorbent particle bed to another.

One specific goal when stenciling sorbent particle bed patterns on the CBS device substrate is to localize the liquid to the sorbent particle beds themselves. This provides a means for the liquid to travel along a predetermined route on the CBS device substrate. Localized flow routes may be achieved with channels cut into the CBS device substrate, or physical barriers (e.g., walls) built up onto the CBS device substrate surface and the sorbent particles filled within the resulting channels.

Localized flow routes may also be achieve by forming inherent liquid barriers between the sorbent particle bed and the substrate of the CBS device based on hydrophilic polarity differences, or in cases where a primer coating is first applied to the substrate, between the sorbent particle bed and the primer layer. Inherent liquid barriers may rely on a difference between the hydrophilic polarity between the sorbent bed and the underlying surface, where the polarity of the elution solvent is similar to the sorbent bed as compared to the underlying substrate. The elution solvent will then interact only with the particle bed and not flow into regions of negative space on the substrate.

A primer layer, which is chemically adhesive to the substrate and chemically adhesive to the sorbent particles, may enhance the bonding of the sorbent particle bed to the substrate. The primer may be chemically similar to the sorbent particles, thereby reducing any hydrophilic polarity difference.

Referring to FIG. 1A, in one embodiment, a method for forming a solid phase microextraction device 100 includes applying a first sorbent layer 102 including first sorbent particles 104 on a first planar surface 106 of a substrate 108. The solid phase microextraction device 100 may be a CBS device 110. The first planar 106 surface is defined by a base edge 112, a spray edge 114 disposed distal across the substrate 108 from the base edge 112, the spray edge 114 including a tapering tip 116 extending away from the base edge 112, a first lateral edge 118 extending from the base edge 112 to the tapering tip 116, and a second lateral edge 120 extending from the base edge 112 to the tapering tip 116, the second lateral edge 120 being disposed distal across the substrate 108 from the first lateral edge 118. The tapering tip 116 may terminate at a tip terminus 122. The tip terminus 122 may be an angular point, a rounded point, or combinations thereof. The first sorbent layer 102 extends a sampling length 124 from the spray edge 114 toward the base edge 112. Applying the first sorbent layer 102 on the first planar surface 106 includes at least one of screen printing, stencil printing, or applying by additive manufacturing the first sorbent particles 104 on the first planar surface 106.

Suitable dimensions for the solid phase microextraction device 100 include, but are not limited to, about 2.5 mm wide by about 42 mm long by about 0.35 mm thick.

The substrate 108 may be formed of any suitable material, including, but not limited to, stainless steel, wood, polymer, conductive polymer, metals, metal alloys, plastic-metal composites, or combinations thereof.

Applying the first sorbent layer 102 may include applying a slurry comprising the first sorbent particles 104, a binder, and a solvent. Applying the first sorbent layer 102 may further include removing the solvent by drying to form the first sorbent layer 102. Suitable sorbent particles include, but are not limited to, polymeric particles such as silica modified with $C_{18}$ functional groups. Suitable sorbent particles may alternatively include any other sorbent particles known in the liquid chromatography, gas chromatography, or sample preparation arts may be used. Suitable binders include, but are not limited to, polyacrylonitrile, polydimethylsiloxane ("PDMS"), polyvinylidene difluoride ("PVDF"), copolymers of tetrafluoroethylene and 2,2-bistrifluoromethyl-4,5-difluoro-1,3-dioxole, NAFION, or combinations thereof.

The first sorbent particles 104 may include electrically conductive particles, magnetic particles, or both.

The first sorbent layer 102 may have any suitable composition, including, but not limited to, a composition including an organic polymer having a first bulk density of up to 1.5 $g/cm^3$ and an inorganic material and having a second bulk density of at least 4.0 $g/cm^3$.

Figure 1B:
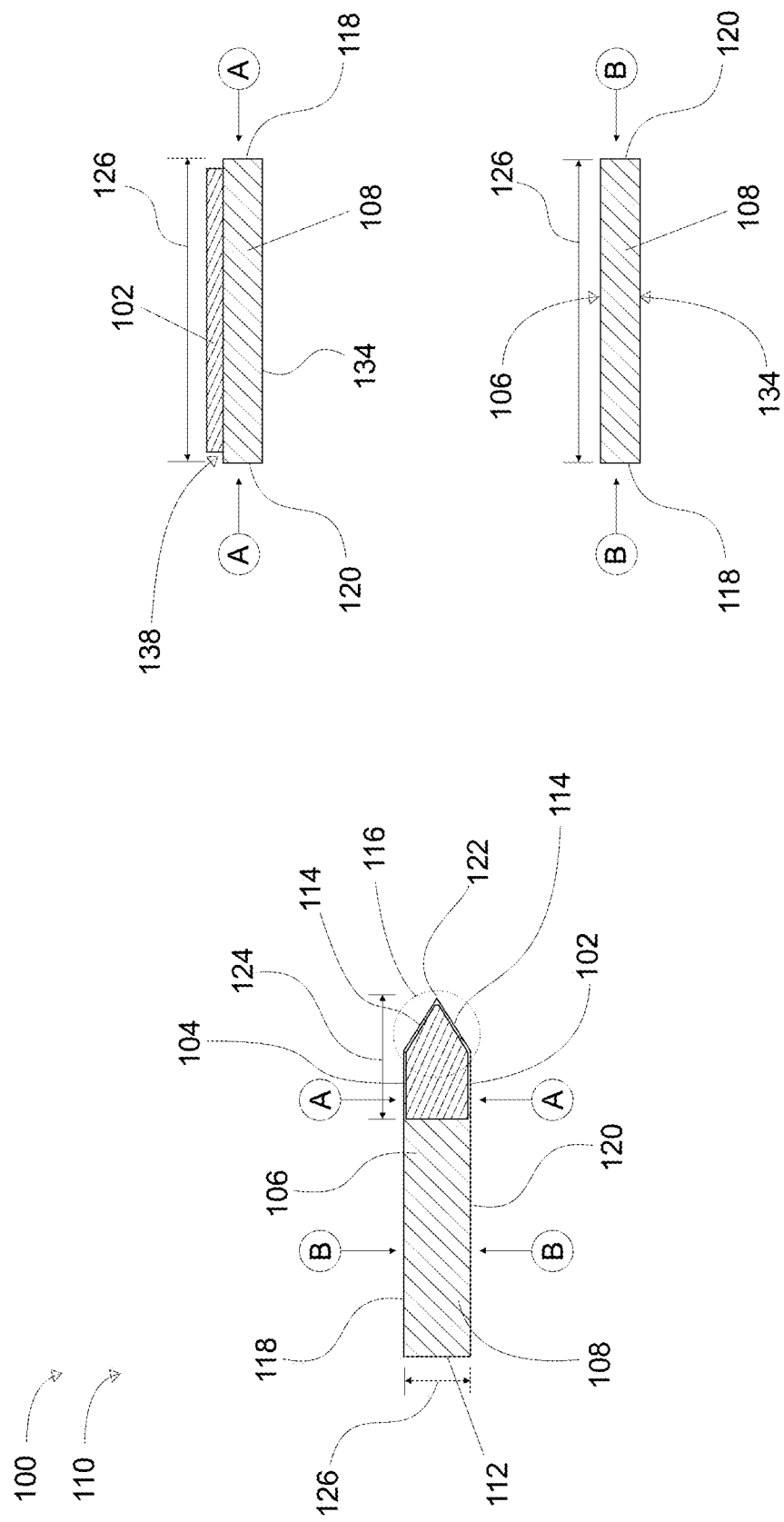
FIG. 1B illustrates a CBS device having a sorbent particle bed applied to a portion of a surface of a solid substrate less than the entire width of the surface, according to an embodiment of the present disclosure.

Referring to FIG. 1B, in one embodiment, the first sorbent layer 102 is disposed over less than an entire width 126 of the first planar surface 106 from the first lateral edge 118 to the second lateral edge 120 along the sampling length 124. Alternatively, as seen in FIG. 1A, the first sorbent layer 102 may be disposed over the entire width 126 of the first planar surface 106 from the first lateral edge 118 to the second lateral edge 120 along the sampling length 124. The recession of the first sorbent layer 103 from the first lateral edge 118 and the second lateral edge 120 leaves exposed strips 138 of substrate 108 (or primer 128, if present) along the first sorbent layer 102.

Figure 1C:
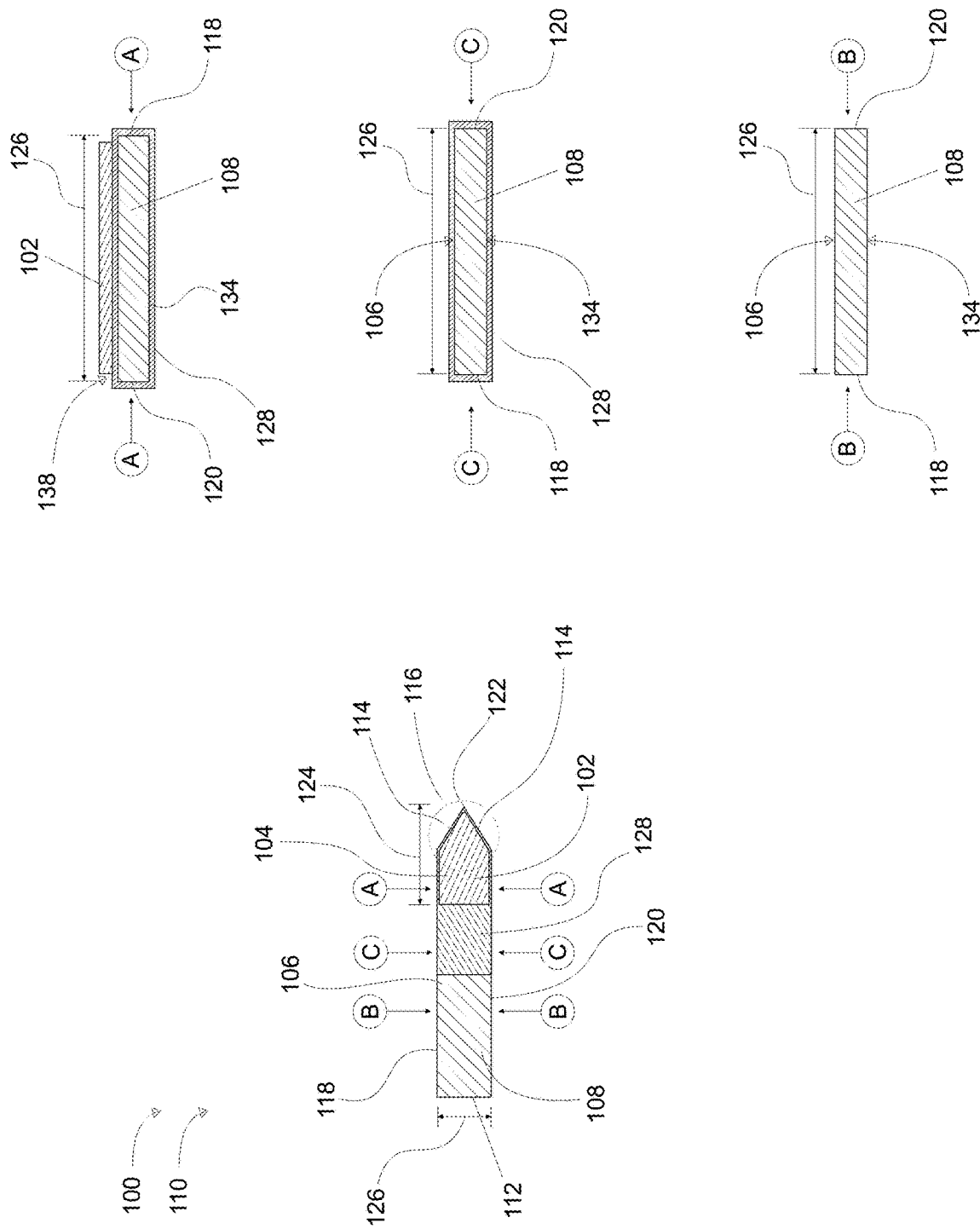
FIG. 1C illustrates a CBS device having a primer layer applied to a portion of a solid substrate and a sorbent particle bed applied to the primer layer over a portion of a surface of a solid substrate less than the entire width of the surface, according to an embodiment of the present disclosure.

Referring to FIG. 1C, in one embodiment, a primer layer 128 is disposed between the substrate 108 and the first sorbent layer 102. "Primer layer" may be used interchangeably with "protective layer." The primer layer 128 may provide an intermediary layer to facilitate bonding of the first sorbent layer 102 to the substrate 108, particularly where the substrate 108 and the first sorbent layer 102 are incompatible or partially incompatible with one another. The primer layer 128 may also provide a protective layer to prevent samples from interacting with the underlying substrate 108 when the solid phase microextraction device 100 is immersed in a sample. In this way, the primer layer 128 may be advantageous in cases where the substrate 108 promotes undesirable adsorption of sample matrix or promotes undesired chemical reaction with elements of the sample. The composition of the primer layer 128 may include, but is not limited to, organic polymers, organic self-assembled monolayers, metal oxides, metals, metalloids, or combinations thereof, such as PAN, PDMS, PVDF, copolymers of tetrafluoroethylene and 2,2-bistrifluoromethyl-4,5-difluoro-1,3-dioxole, NAFION, or combinations thereof. Application of the primer layer 128 to the substrate 108 may employ any coating techniques known in the art or the stenciling techniques herein described.

Figure 1D:
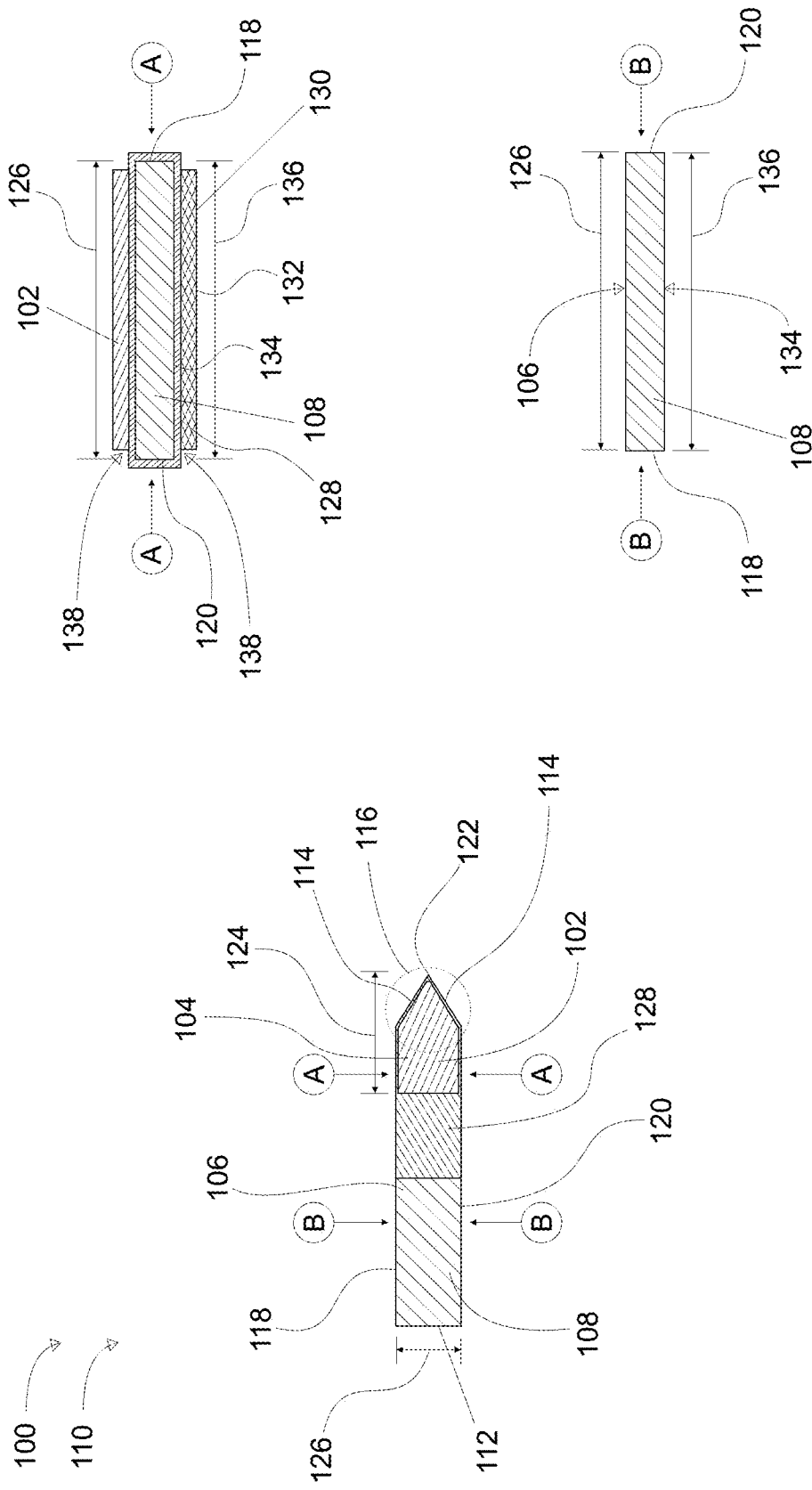
FIG. 1D illustrates a CBS device having a primer layer applied to a portion of a solid substrate, a first sorbent particle bed applied to the primer layer over a portion of a first surface of a solid substrate less than the entire width of the first surface, and a second sorbent particle bed applied to the primer layer over a portion of a second surface of a solid substrate less than the entire width of the second surface, according to an embodiment of the present disclosure.

Referring to FIG. 1D, in one embodiment, the solid phase microextraction device 100 further includes a second sorbent layer 130 including second sorbent particles 132 disposed on a second planar surface 134 of the substrate 108 and extending from the spray edge 114 toward the base edge 112. The second sorbent particles 132 may be compositionally distinct from or identical to the first sorbent particles 104. As used herein, "compositionally distinct" includes the material composition of the sorbent particles themselves, the binder composition adhering the sorbent particles, the sorbent particle concentration per unit area of the sorbent layer, the mixture ratios of the different sorbent particles within a sorbent layer, or combinations thereof. The second sorbent layer 130 may be disposed over less than the entire width 136 of the second planar surface 134 from the first lateral edge 118 to the second lateral edge 118 along the sampling length 124 (shown) or over the entire width 136 of the second planar surface 134 from the first lateral edge 118 to the second lateral edge 118 along the sampling length 124

(not shown). Incorporation of different sorbent layers may provide selective chemical extraction of different analytes from a sample at the same time or provide application of different elution or ionization processes. Elution and analysis of the molecules captures in a first sorbent layer 102 and a second sorbent layer 130 may utilize a single elution solvent which is compatible with both, thereby contributing to a single analysis, or may utilize distinct elution solvents for each layer such that the elution solvents may be delivered in series or in parallel analysis methods.

Figure 1E:
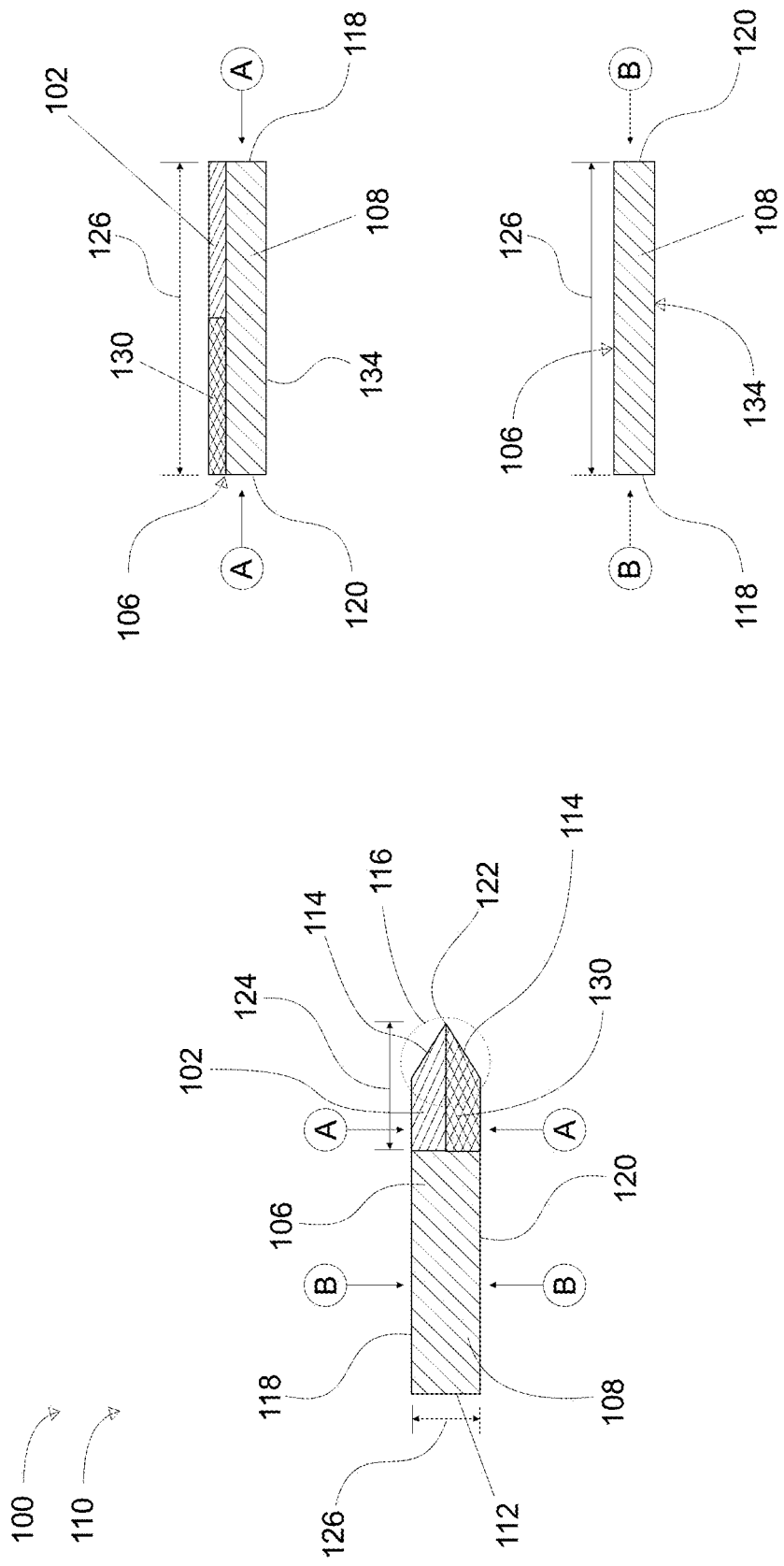
FIG. 1E illustrates a CBS device having a first sorbent particle bed and a second sorbent particle bed applied to a portion of a surface of a solid substrate, according to an embodiment of the present disclosure.

Referring to FIG. 1E, in one embodiment, the solid phase microextraction device 100 further includes a second sorbent layer 130 including second sorbent particles 132 disposed on the first planar surface 106 and extending from the spray edge 114 toward the base edge 112, wherein the second sorbent particles 132 are compositionally distinct from the first sorbent particles 104. The first sorbent layer 102 and the second sorbent layer 130 together may be disposed over less than the entire width 126 (not shown) or over the entire width 126 (shown) of the first planar surface 106 from the first lateral edge 118 to the second lateral edge 120 along the sampling length 124. The two discreet sorbent layers may provide chemically selectively extraction of different analytes from the same sample at the same time. Subsequent elution and analysis may employ a single elution solvent that is compatible with both sorbent layers, where both layers concurrently contribute to a single analysis, or a first elution solvent compatible with the first sorbent layer 102 and a second elution solvent compatible with the second sorbent layer 130 with the elution solvents delivered either in series or in a parallel analysis methods.

Referring to FIG. 1F, in one embodiment, the solid phase microextraction device 100 has a first sorbent layer 102 including two finger regions 140 extending from the tapering tip 116. These finger regions 140 may serve as receptacles of the elution solvent which, after application, wicks to the tapering tip 116 and ultimately are sprayed into the mass spectrometer. These finger regions 140 may also provide for application of other liquids such as elution solvents containing internal standards, elution solvents containing reagents to increase target analyte(s) signal, or elution solvents with different physicochemical properties that facilitate elution of other analytes from the first sorbent layer 102.

Figure 1G:
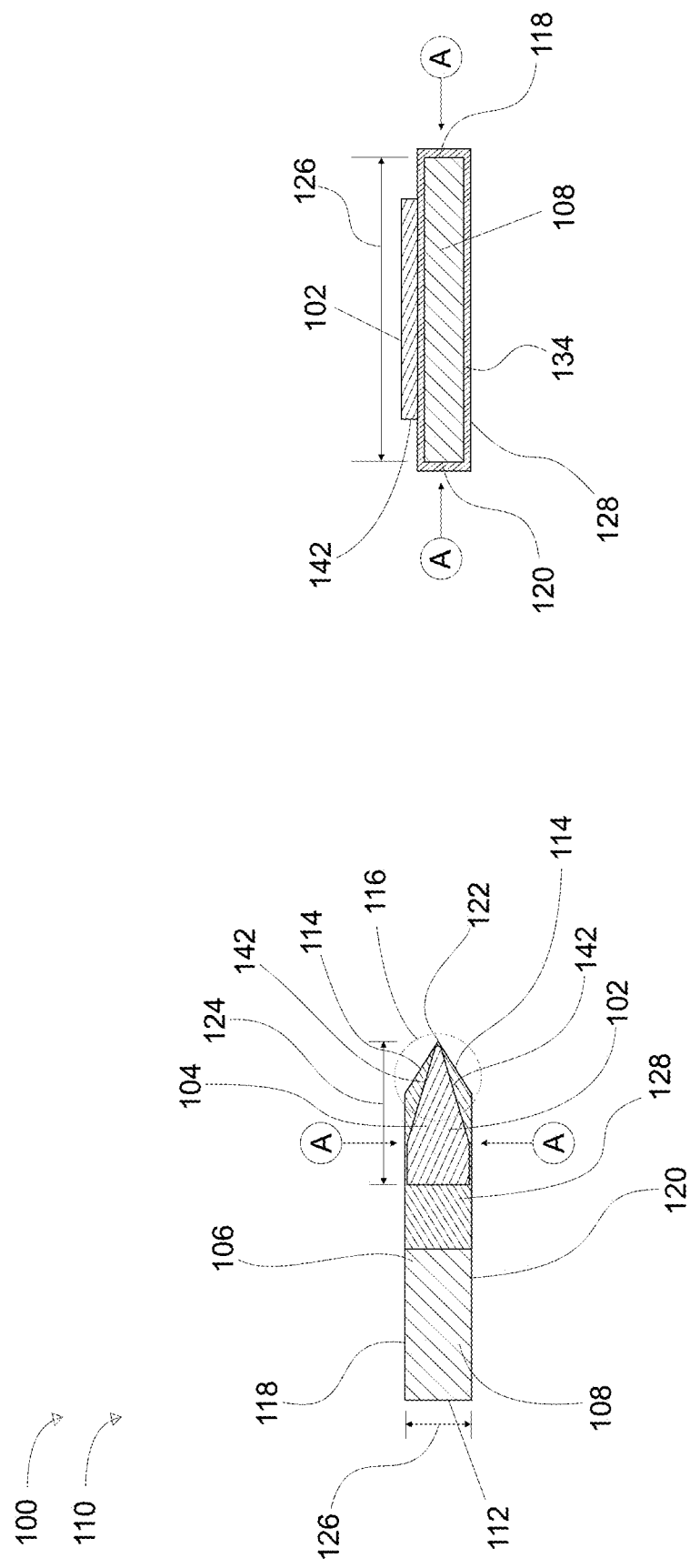
FIG. 1G illustrates a CBS device having a primer layer applied to a solid substrate and a sorbent particle bed applied to the primer layer over a portion of a surface of a solid substrate less than the entire width of the surface such that the sorbent particle bed tapes more sharply than a tapered portion of the solid substrate, according to an embodiment of the present disclosure.

Referring to FIG. 1G, in one embodiment, the first sorbent layer 102 includes an acute taper 142 relative to the tapering tip 116. In this manner, the acute taper 142 controls the focusing flow of the elution solvent to the tip terminus 122. The electric field required for generating the electrospray cone may be determined by the shape of the tapering tip 116 of the substrate 108.

Referring to FIG. 2, in one embodiment, the first sorbent layer 102 includes a first portion 200 including first sorbent particles 104 and a second portion 202 including second sorbent particles 132, the first sorbent particles 104 being compositionally distinct from the second sorbent particles 132. The first sorbent layer 102 may further include a third portion 204 including third sorbent particles 206, the third sorbent particles 206 being compositionally distinct from the first sorbent particles 104 and the second sorbent particles 132. The first portion 200 may be disposed between the spray edge 114 and each of the second portion 202 and the third portion 204. Each of the different portions of the first sorbent layer 102 may have different thicknesses or uniform thickness.

Figure 3A:
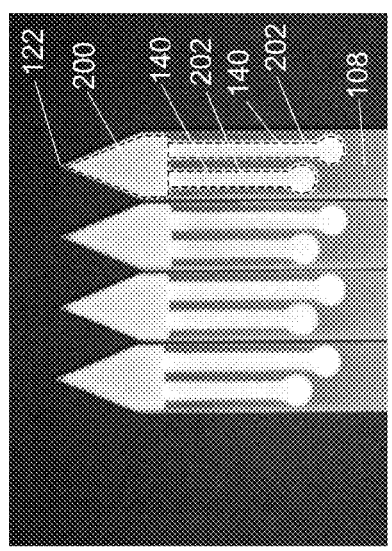
FIGS. 3A, 3B, and 3C are photographs each of four replicate CBS devices having sorbent particle beds applied to portions of surfaces of solid substrates less than the entire widths of the surfaces, according to embodiments of the present disclosure.
Figure 3B:
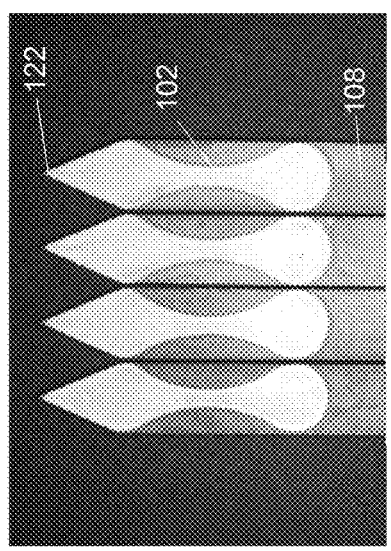
Figure 3C:
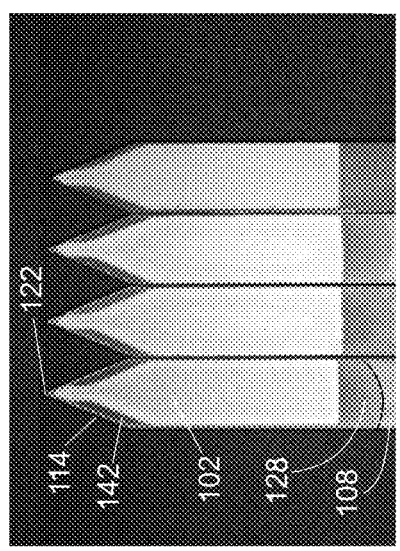

FIGS. 3A, 3B, and 3C depict photographs of three complex sorbent bed designs applied to solid phase microextraction devices 100. The sorbent compositions are mixtures of PAN and hydrophilic-lipophilic-balanced ("HLB") particles (in FIG. 3A silver-coated hollow glass microspheres and in FIGS. 3B and 3C are hollow glass microspheres). Each photograph shows four replicate solid phase microextraction devices 100. FIG. 3A depicts a complex solid phase microextraction device 100 with two finger regions 140 similar to those described in FIGS. 1F and 2. The application of first portion 200 and second portion 202 were performed separately, using separate stencils with the final shape being the combination of the two layers. FIGS. 3B and 3C describe designs to control the flow of elution solvent along the first sorbent layer 102 as the solvent migrates to the tip terminus 122. In all three cases, the shape of the first sorbent layer 102 is defined by the first sorbent layer 102 itself and not the substrate 108.

Figure 4:
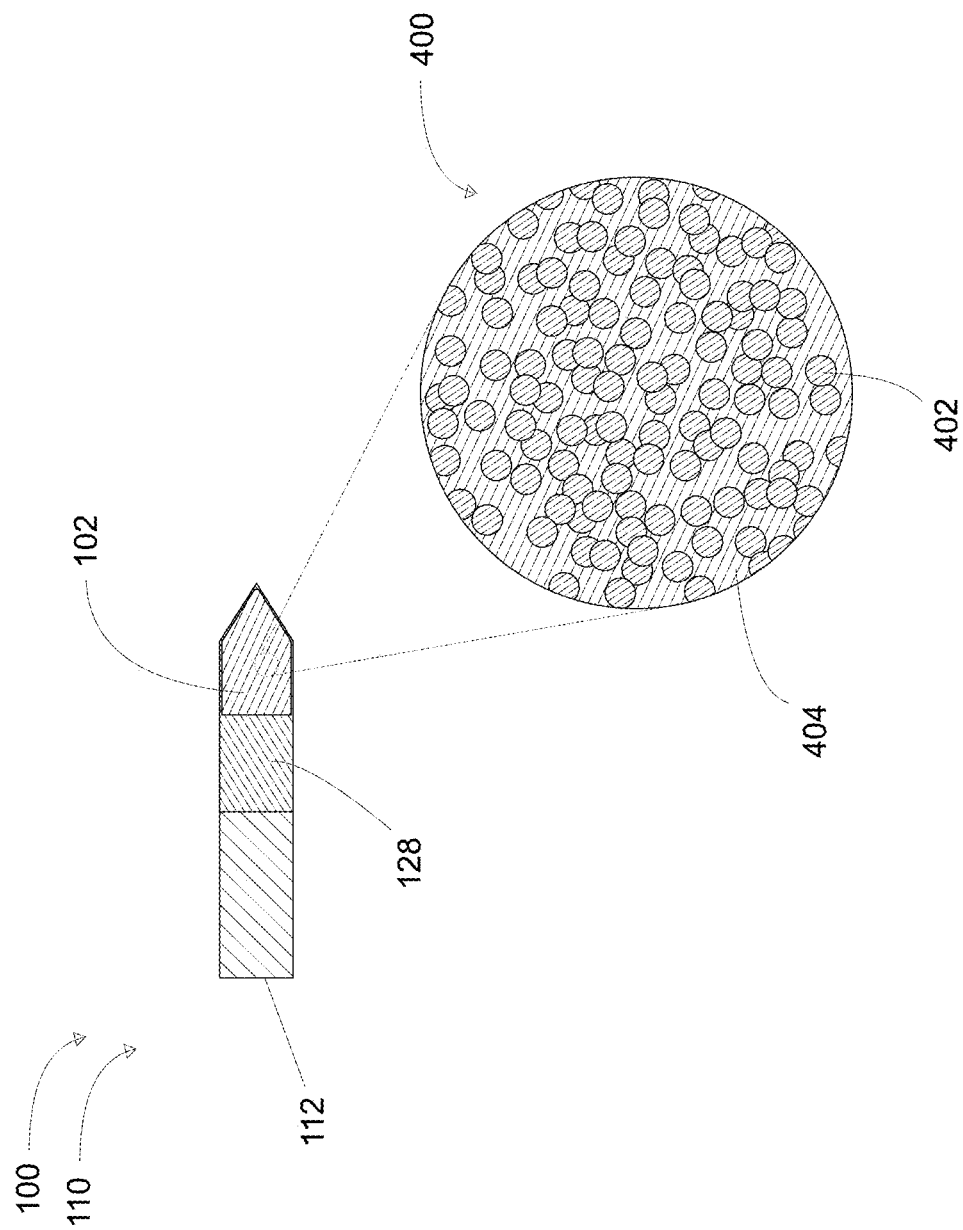
FIG. 4 illustrates a CBS device having a sorbent particle bed applied to a portion of surface of a solid substrate, the sorbent particle bed including a single type of sorbent particle, according to an embodiment of the present disclosure.

FIG. 4 shows a solid phase microextraction device 100 having a primer layer 128 and a first sorbent layer 102. Magnified view 400 of the first sorbent layer 102 shows one sorbent particle type 402 immobilized into place with binder 404.

Figure 5:
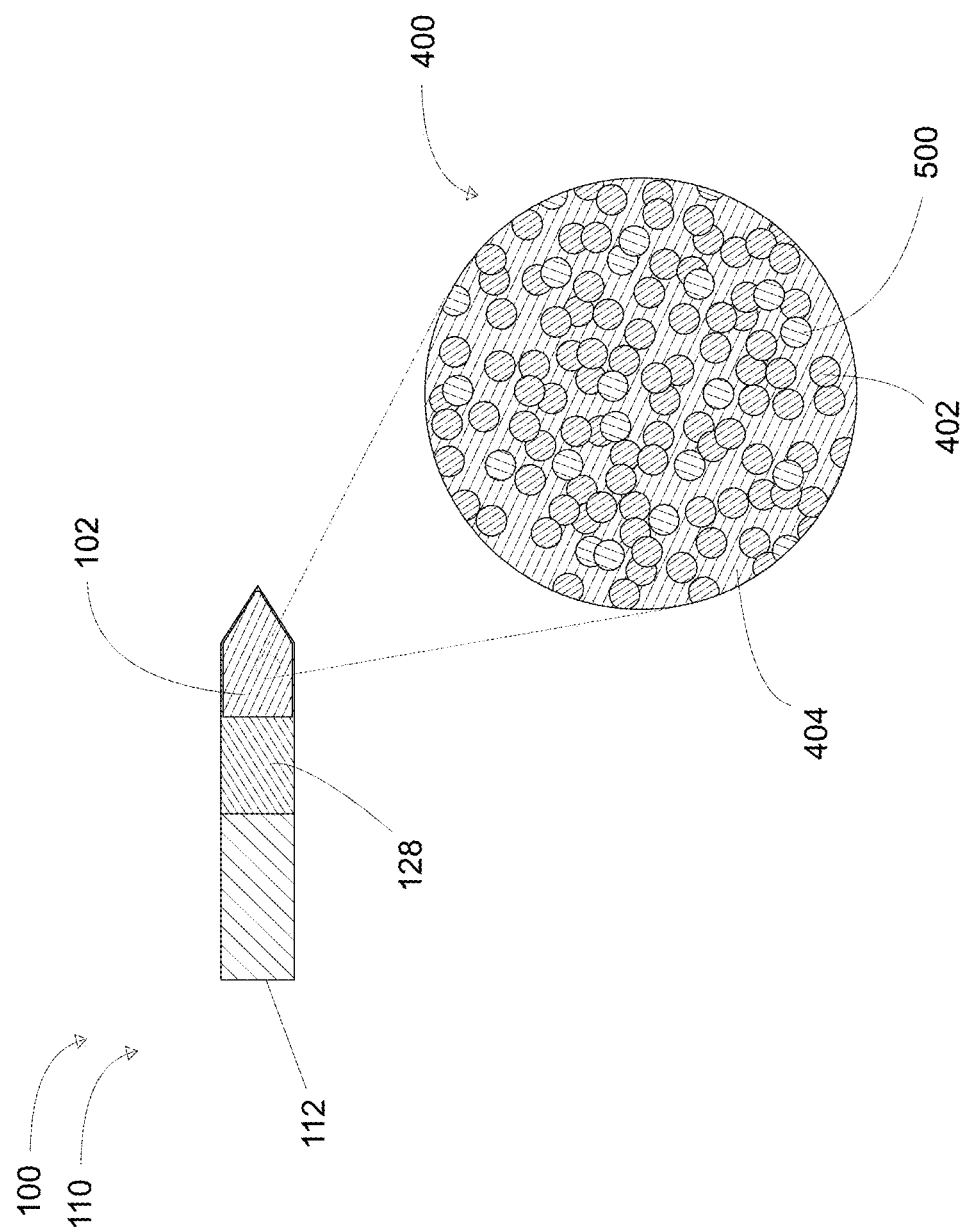
FIG. 5 illustrates a CBS device having a sorbent particle bed applied to a portion of surface of a solid substrate, the sorbent particle bed including two types of sorbent particles, according to an embodiment of the present disclosure.

FIG. 5 shows a solid phase microextraction device 100 with two sorbent particle types immobilized in the first sorbent layer 102. Magnified view 400 of the first sorbent layer 102 shows one sorbent particle type 402 and a second particle type 500, both immobilized into place with binder 404.

Figure 6:
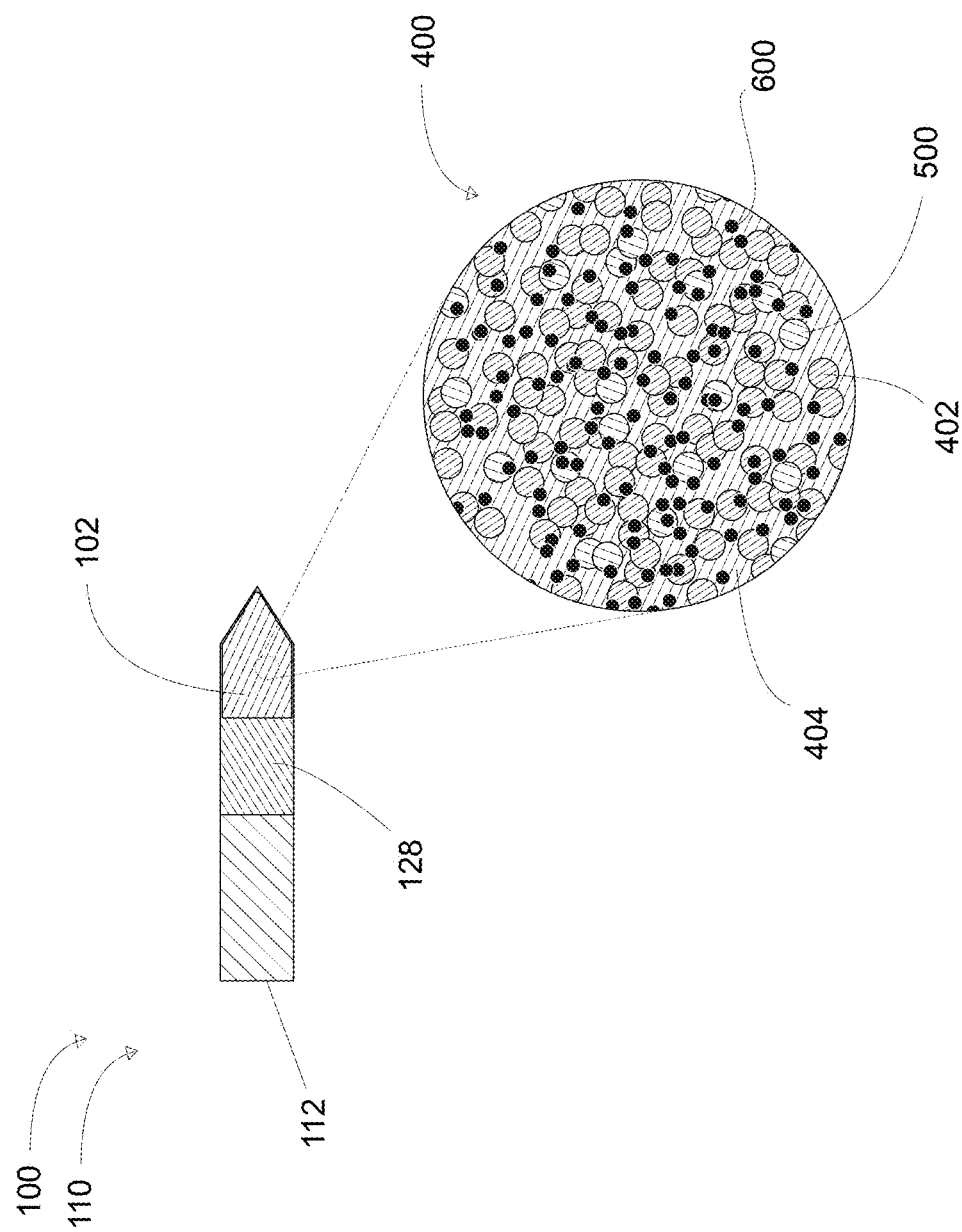
FIG. 6 illustrates a CBS device having a sorbent particle bed applied to a portion of surface of a solid substrate, the sorbent particle bed including three types of sorbent particles, according to an embodiment of the present disclosure.

FIG. 6 shows a solid phase microextraction device 100 with three sorbent particle types immobilized in the first sorbent layer 102. Magnified view 400 of the first sorbent layer 102 shows one sorbent particle type 402, a second particle type 500, and a third particle type 600 all immobilized into place with binder 404. FIG. 6 illustrates particles having grossly different sizes uniformly distributed throughout the first sorbent layer 102. The high viscosity, paste-like slurries employed with stenciling techniques may provide for homogeneous layers of grossly dissimilar particle sizes, concentration, and densities.

EXAMPLES

Comparative exemplary CBS devices 110 were prepared using a dip-coat technique.

Inventive CBS devices 110 of Examples 1-5 were stencil printed. For each such CBS device 110, the first planar surface 106 of a substrate 108 was roughened either by chemically etching the first planar surface 106 with HCl or by sand blasting the first planar surface 106 with silicon carbine grit. Surface profilometry measurements indicate both roughening techniques resulted in similar levels of roughness. The roughened substrates 108 were dip primed with the PAM/DMF stock solvent and heated to 150° C. for 2 minutes. The particle slurries were formulated with sorbent particles as described in Table 1.

Materials for Use in Manufacturing CBS Devices

|   |   | Particle Size Ranges | Particle Density | Source |
|---|---|---|---|---|
| 1 | HLB Sorbent Particles | 5 μm | | Waters |
| 2 | Hollow Glass Micro-Spheres | 5-30 μm | 0.1-0.7 g/cm$^3$ | Cospheric LLC (Santa Barbara, CA) |

-continued

| | Particle Size Ranges | Particle Density | Source |
|---|---|---|---|
| 3 Hollow Glass Micro-Spheres, Silver Coated Silver Thickness: 50 Nm | 5-30 μm | 0.72 g/cm³ | Cospheric LLC (Santa Barbara, CA) |
| 4 Stainless Steel Micro Spheres | 1-22 μm | 7.7-7.9 g/cm³ | Cospheric LLC (Santa Barbara, CA) |
| 5 Superficially Porous Silica Particles | | | |

Stenciled particle bed shapes illustrated in FIGS. 3A 3B, and 3C were prepared using an HDI stencil system and heated to 150° C. for 2 minutes. The final bed thickness was approximately 30 μm. Visual inspection using a 10× magnification microscope showed uniform particle distribution for all particle types across the sorbent bed regions.

Equipment used includes a Model MSP-053 from Hary Manufacturing Inc. (Lebanon, NJ) screen printer and 50 μm thick stainless steel 8"×10" aluminum frame stencils from Hary Manufacturing Inc. (Lebanon, NJ).

TABLE 1

CBS Devices Described in FIGS. 3A, 3B, and 3C and Manufactured Using Stenciling Techniques Herein Described

| | Comparative Example | Ex. 1 | Ex. 2 | Ex. 3 | Ex. 4 | Ex. 5 |
|---|---|---|---|---|---|---|
| HLB particles | 0.65 g | 0.31 g | 0.31 g | 0.31 g | 0.31 g | 0.31 g |
| Hollow Glass Micro-spheres | — | — | 0.5 g | — | — | 0.15 g |
| Hollow Glass Micro-Spheres, Silver Coated | — | — | — | 0.5 g | — | — |
| Stainless Steel Micro Spheres | — | — | — | — | 0.5 g | 0.15 g |
| FIG. | | | 3C | 3A | 3B | — |
| Spray results | Successful Taylor cone emission to MS inlet | Successful Taylor cone emission to MS inlet | Successful Taylor cone emission to MS inlet | Successful Taylor cone emission to MS inlet | Successful Taylor cone emission to MS inlet | Successful Taylor cone emission to MS inlet |

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A solid phase microextraction device, comprising:
   a substrate having a first surface and a terminus; and
   a first sorbent layer disposed on the first surface and extending a sampling length from the terminus, the first sorbent layer including first sorbent particles and constituting a microextraction solid phase,
   wherein:
   the first sorbent layer is disposed over less than an entire width of the first surface along the sampling length and the first sorbent layer includes at least one of channels, reservoir regions remote from the terminus, channels narrowing toward the terminus, finger regions, acute tapers relative to the first surface, or combinations thereof protruding from the first surface; or
   the solid phase microextraction device further includes second sorbent particles disposed on the first surface such that the second sorbent particles are disposed as a second homogenous portion of the first sorbent layer and the first sorbent particles constitute a first homogenous portion of the first sorbent layer, the second sorbent particles being compositionally distinct from the first sorbent particles; or
   the solid phase microextraction device further includes third sorbent particles disposed on a second surface extending from the terminus as a second sorbent layer, the second surface being rotationally displaced about the sampling length from the first surface, the third sorbent particles being physically remote from the first sorbent particles, and the third sorbent particles being compositionally distinct from the first sorbent particles or compositionally identical to the first sorbent particles; or
   combinations thereof.

2. The solid phase microextraction device of claim 1, wherein the first sorbent layer has a composition including an organic polymer having a first bulk density of up to 1.5 g/cm³ and an inorganic material and having a second bulk density of at least 5.0 g/cm³.

3. The solid phase microextraction device of claim 1, wherein the first sorbent particles include at least one of electrically conductive particles or magnetic particles.

4. The solid phase microextraction device of claim 1, further including a primer layer disposed between the substrate and the first sorbent layer.

5. The solid phase microextraction device of claim 1, wherein the first sorbent layer is disposed over the less than an entire width of the first surface along the sampling length and the first sorbent layer includes the at least one of the channels, the reservoir regions remote from the terminus, the channels narrowing toward the terminus, the finger regions, the acute tapers relative to the first surface, or combinations thereof protruding from the first surface.

6. The solid phase microextraction device of claim 5, wherein the solid phase microextraction device further includes the second sorbent layer comprising the third sorbent particles disposed on the second surface extending from the terminus.

7. The solid phase microextraction device of claim 6, wherein the third sorbent particles are compositionally distinct from the first sorbent particles.

8. The solid phase microextraction device of claim 6, wherein the second sorbent layer is disposed over less than an entire width of the second surface along the sampling length and the second sorbent layer includes the at least one of the channels, the reservoir regions remote from the terminus, the channels narrowing toward the terminus, the finger regions, the acute tapers relative to the second surface, or combinations thereof protruding from the second surface.

9. The solid phase microextraction device of claim 5, wherein the solid phase microextraction device further includes the second sorbent particles disposed on the first surface such that the second sorbent particles are disposed as the second homogenous portion of the first sorbent layer and the first sorbent particles constitute the first homogenous portion of the first sorbent layer, the second sorbent particles being compositionally distinct from the first sorbent particles.

10. The solid phase microextraction device of claim 9, wherein the first sorbent layer further includes a third portion including fourth sorbent particles, the fourth sorbent particles being compositionally distinct from the first sorbent particles and the second sorbent particles.

11. The solid phase microextraction device of claim 10, wherein the first portion is disposed between the terminus and each of the second portion and the third portion.

12. The solid phase microextraction device of claim 1, wherein the solid phase microextraction device includes the second sorbent particles disposed on the first surface such that the second sorbent particles are disposed as the second homogenous portion of the first sorbent layer and the first sorbent particles constitute the first homogenous portion of the first sorbent layer, the second sorbent particles being compositionally distinct from the first sorbent particles.

13. The solid phase microextraction device of claim 12, wherein the first sorbent layer further includes a third portion including fourth sorbent particles, the fourth sorbent particles being compositionally distinct from the first sorbent particles and the second sorbent particles.

14. The solid phase microextraction device of claim 13, wherein the first portion is disposed between the terminus and each of the second portion and the third portion.

15. The solid phase microextraction device of claim 1, wherein the solid phase microextraction device includes the third sorbent particles disposed on the second surface extending from the terminus as the second sorbent layer, the second surface being rotationally displaced about the sampling length from the first surface, the third sorbent particles being physically remote from the first sorbent particles.

16. The solid phase microextraction device of claim 15, wherein the third sorbent particles are compositionally distinct from the first sorbent particles.

* * * * *